US 8,268,156 B2

(12) United States Patent
Leavy

(10) Patent No.: US 8,268,156 B2
(45) Date of Patent: Sep. 18, 2012

(54) MULTI MATERIAL SECONDARY METALLIZATION SCHEME IN MEMS FABRICATION

(75) Inventor: Montray Leavy, Arcadia, CA (US)

(73) Assignee: Advantest America, Inc., Cupertino, CA (US)

( * ) Notice: Subject to any disclaimer, the term of this patent is extended or adjusted under 35 U.S.C. 154(b) by 0 days.

(21) Appl. No.: 13/308,545

(22) Filed: Dec. 1, 2011

(65) Prior Publication Data

US 2012/0070980 A1    Mar. 22, 2012

Related U.S. Application Data

(62) Division of application No. 12/608,873, filed on Oct. 29, 2009.

(51) Int. Cl.
*C25D 5/10* (2006.01)
(52) U.S. Cl. ............... 205/170; 205/220; 205/223
(58) Field of Classification Search .......... 205/170, 205/220
See application file for complete search history.

(56) References Cited

U.S. PATENT DOCUMENTS

| | | | | |
|---|---|---|---|---|
| 5,190,637 A * | 3/1993 | Guckel | ............ | 205/118 |
| 7,180,316 B1 * | 2/2007 | Ismail et al. | ............ | 324/756.03 |
| 7,264,984 B2 * | 9/2007 | Garabedian et al. | ............ | 438/48 |
| 2004/0000484 A1 * | 1/2004 | Sun et al. | ............ | 205/81 |
| 2006/0011483 A1 * | 1/2006 | Mayer et al. | ............ | 205/118 |
| 2006/0134820 A1 * | 6/2006 | Tang et al. | ............ | 438/48 |
| 2007/0024298 A1 * | 2/2007 | Khoo et al. | ............ | 324/754 |

OTHER PUBLICATIONS

"Monolithic Integration of 3-D Electroplated Microstructures with Unlimited Number of Levels Using Planarization with a Sacrificial Metallic Mold (PSMM)" by Yoon et al., Micro Electro Mechanical Systems, pp. 624-629 (1999).*

* cited by examiner

*Primary Examiner* — Harry D Wilkins, III
*Assistant Examiner* — Bryan D. Ripa
(74) *Attorney, Agent, or Firm* — Manuel F. de la Cerra

(57) ABSTRACT

Processes are provided herein for the fabrication of MEMS utilizing both a primary metal that is integrated into the final MEMS structure and two or more sacrificial secondary metals that provide structural support for the primary metal component during machining. A first secondary metal is thinly plated around the primary metal and over the entire surface of the substrate without using photolithography. A second secondary metal, is then thickly plated over the deposited first secondary metal without using photolithography. Additionally, techniques are disclosed to increase the deposition rate of the first secondary metal between primary metal features in order to prevent voiding and thus enhance structural support of the primary metal during machining.

11 Claims, 3 Drawing Sheets

MULTI MATERIAL SECONDARY METALLIZATION SCHEME IN MEMS FABRICATION

CROSS-REFERENCE TO RELATED APPLICATIONS

This application is related to U.S. application Ser. No. 12/608,857 entitled "A Superfilling Secondary Metallization Process in MEMS Fabrication", filed on Oct. 29, 2009 by the same inventor as the present patent application. U.S. application Ser. No. 12/608,857 is expressly incorporated by reference herein in its entirety and is assigned to the same assignee as the present patent application.

FIELD OF THE INVENTION

The teachings herein are directed to new methods of utilizing at least two different secondary metals, a first and a second secondary metal, during the fabrication of MicroElectroMechanical systems (hereinafter "MEMS").

BACKGROUND

MEMS, also known in the art as "micromachines," are typically made up of individual components and generally range in size from 5 micrometers to a millimeter. They can consist of a central unit that processes data, the microprocessor and several components that interact with the outside such as microsensors.

According to prior art methods, the components of MEMS can be formed using photolithography and sacrificial layers. For example, multiple mask exposures which are capable of producing substantially arbitrary three-dimensional shapes are disclosed in U.S. Pat. No. 5,190,637 to Guckel (hereinafter "Guckel"), which is hereby incorporated by reference in its entirety. According to Guckel, a layer of photoresist capable of exposure by radiation is applied to a plating base. The photoresist is then exposed to radiation using a mask. The mask allows the radiation to only "expose" a certain defined area of the photoresist. Subsequent developing removes photoresist selective to the exposure creating a cavity that replicates the plan of the exposure mask. The cavity formed in the photoresist is then filled by a primary metal that is electroplated on to an exposed plating base. The remaining photoresist is then removed and a secondary metal (a sacrificial metal) is electroplated over the entirety of the primary metal and plating base. The primary metal and the secondary metal are then machined by mechanical means down to a height which exposes the primary metal and planarizes the surface for subsequent processing. After machining, another layer of photoresist can be applied across both the primary and secondary metals, and then this photoresist is also patterned using the same procedures as above. After the primary metal has been electroplated into the cavity created in the photoresist, the rest of the photoresist is removed and the secondary metal is electroplated over the entirety of the first secondary metal, any exposed first primary metal and the newly added second primary metal. Both the second primary and second secondary metals are machined down to the desired thickness of the second layer of the primary metal and the process is repeated until the desired number of layers have been formed creating the desired microstructure in the primary metal. Once the microstructure has been formed, the entirety of the plating surface together with the primary and secondary metals are exposed to an etching agent that selectively etches away the secondary metal but not the primary metal, thus leaving only the primary metal and the plating surface.

According to the teachings of Guckel, the secondary metal is used in conjunction with the photoresist because of the structural stability that it affords the primary metal during machining. Machining cannot generally be done using only the photoresist and the (primary metal because the photoresist is relatively weak mechanically and may not adequately support the primary metal from damage due to the largely lateral forces encountered in the mechanical machining process (which may include, grinding, lapping, polishing, chemo-mechanical polishing, electric discharge machining, or any other commonly encountered machining process). Another advantage the secondary metal affords is that it conveniently provides a conductive plating base for subsequent layers of primary metal that overhang underlying primary metal structures. Otherwise, the overhanging plating would require an additional thin film seed layer deposition step.

However, significant (problems arise using the Guckel method when multiple or very laterally large microstructures are built on a single substrate, such as when manufacturing MEMS to be used as semiconductor testing probe heads. Plating the secondary metal across the entirety of the plating surface (e.g., ceramic) according to the teachings of Guckel causes the plating base to bow and warp under the stress of the additional sacrificial metal. This, in turn, causes two related problems: 1) it becomes difficult or impossible to machine the different layers to a uniform thickness and 2) it becomes difficult or impossible to perform the lithography because micro-lithography requires a planar surface.

U.S. Pat. No. 7,264,984 to Garabedian, et al, (hereinafter "Garabedian") and U.S. Pat. No. 7,271,022, to Tang et al. (hereinafter "Tang"), both of which are incorporated by reference herein in their entireties, improved upon the teachings of Guckel by disclosing processes for creating micromechanical and MEMS structures, such that multiple or large structures may be built on the same substrate, without the substrate warping. More specifically, Tang discloses a method where the secondary metal is not plated over the entirety of the substrate's structured area Instead the secondary metal is only plated in an area surrounding the primary metal structure, creating an "island," so that it lends its structural stability to the primary metal structure, but does not cause undue stress on the substrate. According to the teachings in Tang, the sacrificial secondary metal is only plated where it is needed for mechanical stability and for the creation of structural overhangs, instead of requiring the secondary metal to be formed in the entire area encompassing all structural metal regions on the substrate.

Despite the improvements advanced in Garabedian and Tang, disadvantages remain. More specifically, the secondary metallization schemes of these references rely on photolithography to create a cavity immediately surrounding the primary metal and configured to hold the secondary metal. Photolithography is a time-consuming process that involves custom masks and photoresists to create the desired designs needed for plating the secondary metal. Accordingly, it is an objective of the teachings herein to provide a new method of MEMS fabrication that does not rely on photolithography with respect to plating secondary metals.

A further distinction between Garabedian and Tang and the present invention is that, neither of these references teach the use of secondary metals to cover the entire substrate for each layer, or anything less than a majority of layers, of a multi-layer intermediary MEMS structure. In contrast, both of these patents teach that if a secondary metal is plated over the entire surface of a substrate for too many levels, the substrate will warp. While these patents disclose, as non-preferred embodiments, the plating of secondary metal over the entire substrate for the first layer, or the initial layers of primary metal, they teach away from plating secondary metals over the entire substrate for each layer involved in a multi-layer MEMS fabrication process, in order to prevent warpage of the substrate. (See Tang, col. 7, lines 9-56). More explicitly, Tang stresses that the majority of secondary metal layers in a multi layered intermediary MEMS structure are not plated across the entire substrate. (See Tang, col. 7, lines 12-14)

Still another disadvantage of the methods provided in Garabedian and Tang is that their secondary metallization processes can lead to voiding in the secondary metal in between primary metal structures, using current deposition techniques. Voiding is undesirable as it minimizes the structural support the secondary metal provides the primary metal during the machining process. Due to the susceptibility of voiding in the secondary metallization process using current depositary techniques, there is a need in the art to provide a void-free secondary metallization scheme as part of the MEMS fabrication process.

While attempts have been made in the past to address voiding in the deposition of primary metals in cavities, such as during semi-conductor fabrication, these techniques focus on voiding in terms of electrical conductivity in metals that are integral to the final completed structure. Examples of superfilling primary metals for semi-conductor fabrication, are set forth in U.S. Pat. No. 6,946,716 to Andricacos, et al. (hereinafter "Andricacos") and U.S. Pat. No. 6,432,821 to Dubin, et al. (hereinafter "Dubin"), both of which are incorporated herein in their entireties. The methodology provided in these disclosures is in sharp contrast to the present teachings, wherein superfilling is used with a secondary metal that surrounds the primary metal and is sacrificial, such that it is eventually etched away from the primary metal after the primary metal has been machined.

It is important to note that neither Andricacos nor Dubin address the problem of voiding in MEMS fabrication. More specifically, these references are silent as to the voiding of secondary sacrificial metals that surround and provide mechanical support to primary metals during machining. It is thus a further objective of the teachings herein to address this need in the art.

SUMMARY OF THE INVENTION

Embodiments herein are directed to processes for fabricating a multi-layer micro-electro-mechanical system, that include providing a primary metal structure supported by a substrate; depositing a first sacrificial secondary metal in a thin layer around the primary metal structure and over the entire surface of the substrate; depositing a second sacrificial secondary metal in a thick layer around first sacrificial secondary metal and over the entire surface of the substrate; machining the primary and first and second sacrificial secondary metals; repeating these steps until a desired multi-layered structure is fabricated; and etching away the first and second sacrificial secondary metals from the machined primary metal structure to form a multi-layered micro-electro-mechanical system.

Further embodiments are directed to an intermediary, multi-layered, metallic complex to be used in the fabrication of a micro-electro-mechanical system, and having a substrate supporting a plurality of layers of primary and secondary metallic structures, wherein each layer includes: a structure of primary metal that is configured to be integrated into the fabricated micro-electro-mechanical system component; a first sacrificial secondary metal deposited in a thin layer around the primary metal structure and over the entire surface of the substrate; and a second sacrificial secondary metal deposited in a thick layer around the first sacrificial secondary metal structure and over the entire surface of the substrate.

Preferably the deposited first and second sacrificial secondary metals provide horizontal mechanical support to the primary metal during machining and the etching away of the first and second sacrificial secondary metals does not substantially etch the machined primary metal structure. Advantageously, both the first and second sacrificial secondary metals are etched away using the same etching agent. Preferably, the deposited second sacrificial secondary metal is of a lower density than the first sacrificial secondary metal, such that the combination of these metals does not cause the substrate to warp. According to more specific embodiments, the primary metal includes nickel and the first and second secondary metals include copper.

In embodiments wherein the primary metal structure includes cavities along its surface area it is preferred that the rate of deposition of the first sacrificial secondary metal is faster within the primary metal structure's cavities than outside of the cavities such that the deposited secondary metal lacks significant voiding. More specifically, the deposited sacrificial secondary metal can be electroplated from a plating bath comprising organic additives selected from the group consisting of brighteners, levelers, and suppressants. Even more specifically, the plating bath can include copper at 50 g/l, acid at 80 g/l, chloride at 50 ppm, a brightener at 12 mL/L, a suppresser at 2 mL/L, and a leveler at 3 mL/L. Preferred micro-electro-mechanical system include springs that can be used in conjunction with a probe card assembly to test semiconductor devices.

Figure 1A:
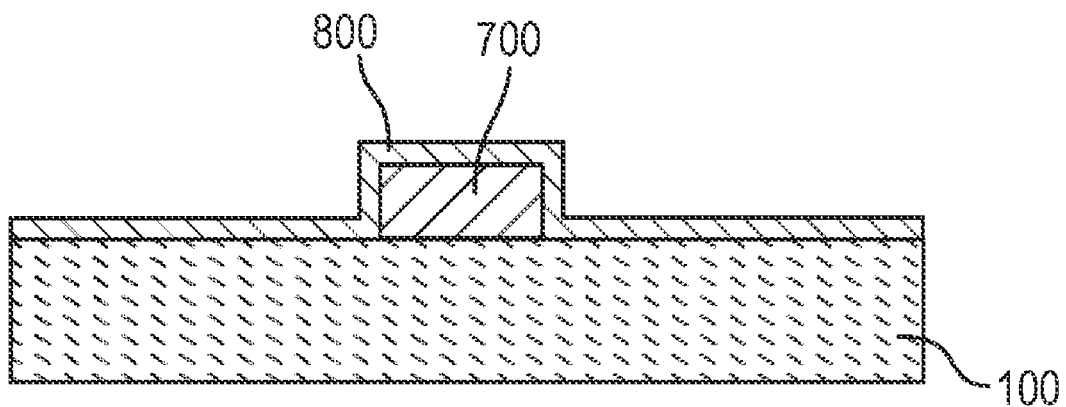
FIG. 1A depicts a first secondary metal plated over a primary metal.

It will be appreciated that the drawings are not necessarily to scale, with emphasis instead being placed on illustrating the various aspects and features of embodiments of the invention.

DETAILED DESCRIPTION OF THE ILLUSTRATED EMBODIMENTS

Embodiments of the present invention are described below. It is, however, expressly noted that the present invention is not limited to these embodiments, but rather the intention is that modifications that are apparent to the person skilled in the art and equivalents thereof are also included.

MEMS

The teachings herein are directed to MEMS fabrication. MEMS generally relate to small integrated devices or systems that combine electrical and mechanical components and can be any number, from a few to millions, in a particular system.

Examples of MEMS applications can non-exclusively include inkjet-printer cartridges, accelerometers, miniature robots, microengines, locks, inertial sensors, microtransmissions, micromirrors, micro actuators, optical scanners, fluid pumps, semi-conductor probes, transducers, and chemical, pressure and flow sensors. MEMS can be capable of sensing, controlling, and activating mechanical processes on the micro scale, and function individually or together to generate effects on the macro scale. The micro fabrication technology enables fabrication of large arrays of devices, which individually perform simple tasks, but in combination can accomplish complicated functions. MEMS can non-exclusively include one or more mechanical elements such as beams, gears, diaphragms, and springs, and the like, for example. The teachings herein can be used to fabricate any suitable MEMS or component of a MEMS. Preferred fabricated MEMS can include multiple or very laterally large microstructures that are built on a single substrate.

According to certain embodiments, the processes provided herein can be used to form a primary metal, micro-machined spring that can be used in conjunction with a probe card assembly to test semiconductor devices such as those built by Touchdown Technologies, Inc. of Baldwin Park, Calif. or those built by Form Factor of Livermore, Calif. In cases where the structure formed is a micro-machined spring, many micro-machined springs may be built on a single substrate using the processes herein, such that many springs may contact a wafer of semiconductor chips at one time. Using the processes presented herein allows for micro-machined springs to be built over a larger area of a single substrate and at a substantially reduced cost then current processes known in the art.

Primary Meal

Primary metal 700 generally relates to a metal that is integrated in the final MEMS product, and can be any suitable metal, such as Nickel, Nickel-alloy, Rhodium, Ni—Mn, Ni—Co, Ni—W, Ni—Cu, Sn, Sn—Pb, Sn—Ag, and Ag. A sacrificial first secondary metal 800 can be used to surround any suitable MEMS component made of a primary metal 700. According to certain embodiments, the primary metal 700 is electroplated onto on top of a substrate 100 utilizing any suitable means of deposition, including photolithography. Using photosresists, masks, and radiation to deposit a primary metal 700 onto a substrate is well known in the art. The primary metal 700 structures provided herein can be deposited according to the teachings of Tang, for example.

In general, a substrate 100 is provided as a base, and may be any type of substrate, such as silicon, germanium and gallium arsenide, ceramics such as alumina, alumina nitride low temperature cofired ceramics (LTCC) and high temperature cofired ceramics (HTCC), metals or glasses. The substrate 100 can include built in vias such that electrical current may be conducted from the top surface of the substrate 100 to the lower surface. In certain embodiments, the vias can be made from gold, but any other conductor such as copper or platinum may also be used. The substrate 100 may also contain electrical redistribution conductors, making it an electrical "space transformer" as is commonly known in the art.

One or more plating surfaces such as Cr/Au seed layer, can be applied to the upper surface(s) of the substrate 100. The plating surface can act as the conductive adhesion layer and plating seed for the primary metal 700 that will form the microstructure to be electroplated on at a later time. The plating surface seed layer may be deposited on the substrate 100 by use of a sputtering machine, or the plate surface seed layer may be e-beam evaporated, spincoated conductive polymer, or electroless plated. The plating seed layer may be any of the commonly known materials and material combinations, such as Cr under Au, Ti under Cu, Ti—W under Au, etc. The seed layer is usually fairly thin and may be applied in a composition of 300 A of Cr and 2000 A of Au, although other compositions and thicknesses may be used in different amounts without departing from the spirit of this invention. If the substrate 100 is made of metal, a plating base may not be used, as the metal may constitute the plating base. Additionally, structures such as dielectric films and interconnect stacks including conductors and dielectric films may lie between the substrate 100 and the plating seed without departing from the spirit of the teachings herein.

In general, any suitable photoresist can be applied to the seed layer or the substrate. A mask can be used such that when radiation is beamed down upon the mask it passes through the mask wherever the mask has been modified to allow passage of the radiation to the photoresist. The photoresist is dissolved in locations directly below the areas where the mask has been modified, creating the cavities configured to receive the primary metal 700. Primary metal can be electrodeposited into the cavities using any suitable means, such as electroplating. The primary metal 700 can be of any type of metal, for instance an alloy of Ni—Mn may be electroplated into the cavity in the amount of 20-25 µm. Because the primary metal 700 is machined (e.g., lapped and polished) in order to planarize the layer and achieve a uniform controlled thickness, the primary metal 700 is typically plated slightly thicker than the layer's desired final thickness. Photoresists can be removed using any suitable method.

Sacrificial Secondary Metals

An important aspect of this invention is that a first secondary metal 800 and second secondary metal 900 are both plated across the entire substrate 100 for each layer of primary metal 700, without causing the substrate 100 to warp. It is noted that the secondary metals do not necessarily need to directly contact the substrate 100 because the substrate 100 may be already covered by a plating base(s). Accordingly, the phrase plating over the entire substrate 100 as used herein can simply refer to the entire surface area encompassed by the substrate 100 and not necessarily the substrate itself.

Plating over the entire substrate can be done for a majority of layers, including every layer, in any suitable MEMS structure, including those having 10 or more, 15 or more, or 20 or more layers, for example. The combination of plating both the first 800 and second secondary metal 900 over the entire substrate 100 is unique in that it provides mechanical stability to the primary metal 700 structure needed during machining (e.g., lapping and polishing) and provides a plating base for subsequent overhanging layers, without warping the substrate 100. Additionally, depositing the first secondary metal 800 and the second secondary metal 900 is not limited to a photolithography process and thus does not require custom designed photoresists, masks, and UV radiation for plating around the primary structure 700. As discussed in the Background section above, prior art methods, such as Garabedian and Tang, teach away from plating secondary metals over the entire substrate for each level in a multiple level MEMS structure. These references discourage practicing the steps of the present invention because those with skill in the art had not figured out a way to plate sufficiently supportive secondary metals over the entire substrate for each layer of a multi-layer MEMS structure without warping the supporting substrate 100. When the substrate 100 is warped it is detrimental because it makes it difficult to planarize the primary metal 700 to a uniform height, During MEMS fabrication, it is highly desirable that the primary metal 700 is machined to provide a planarized structure with no dimples or depressions on the surface.

Figure 2:
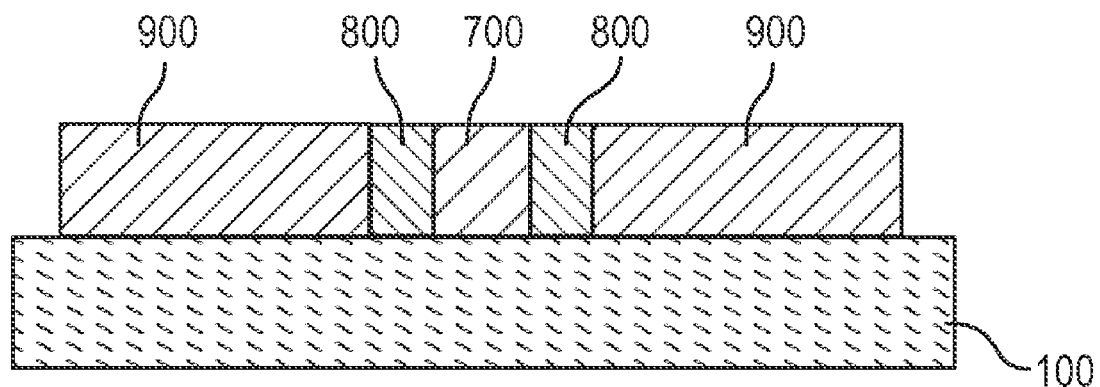
FIG. 2 depicts a prior art first and second secondary metal plated over a primary metal.

FIG. 2 depicts prior art plating of sacrificial metals using photolithography, such as the techniques disclosed by Tang. Following the disclosure of Tang, the deposition of the secondary metal 800 is limited by the pattern created by a photoresist, mask, and radiation. Developing photoresists, masks, and applying radiation are time consuming steps and should be eliminated if possible to simplify MEMS fabrication. In contrast to Tang, the teachings herein are directed to simply dipping the primary metal structure 700 into an electrolytic secondary metal plating bath to coat the entire surface of the substrate 100. The need for creating specific photolithography cavities for the secondary metal pattern is eliminated using the teachings herein.

Both the first secondary metal 800 and the second secondary metal 900 should have similar and different properties with respect to each other. More specifically it is preferred that the first secondary metal 800 is a higher density metal than the second secondary metal 900 yet that both sacrificial metals can be etched away using the same etching agent that does not harm the primary metal 700. According to further embodiments, the first 800 and second 900 secondary metals can differ in one or more of the following characteristics: grain size, grain lattice structure, or ingrain impurity composition. More specifically it is preferred in certain embodiments, that the first secondary metal 800 is a thin, high-density, fine-grain layer, while the second secondary metal 900 layer is thicker, 10 to 200 um, and preferably of sufficient thickness to entirely cover the primary metal, low-density, and of a coarser-grain. According to certain embodiments, the second secondary metal 900 can be the same type of metal as the first secondary metal 800 but mixed with a filler having a lower density than the first secondary metal 800, such as ceramic, for example.

According to preferred embodiments, and as shown in FIG. 1A, the first secondary metal 800 is preferably very thin, and has a high density to provide structural support to the primary metal 700. The first secondary metal 800 can be a high stress metal, which generally relates to 50 MPa and above. The first secondary metal 800 is preferably plated in a thin layer, such as at a thickness between 1000 angstroms to 50 micrometers, If one were to only plate the thin, high density first secondary metal 800 over the entire area of the substrate 100 for each layer of a multi-layer MEMS structure (as shown in FIG. 1A) there would likely not be enough structural support for the primary metal piece 700 during machining (e.g., grinding, lapping, polishing, chemo-mechanical polishing, electric discharge machining, or any other commonly encountered machining processes). In contrast, if a thick layer of high density secondary metal was to be plated over the entire substrate, such that the first secondary metal 800 also covered the area represented by the second secondary metal 900 in FIG. 1B, the substrate 100 would likely warp.

Figure 1B:
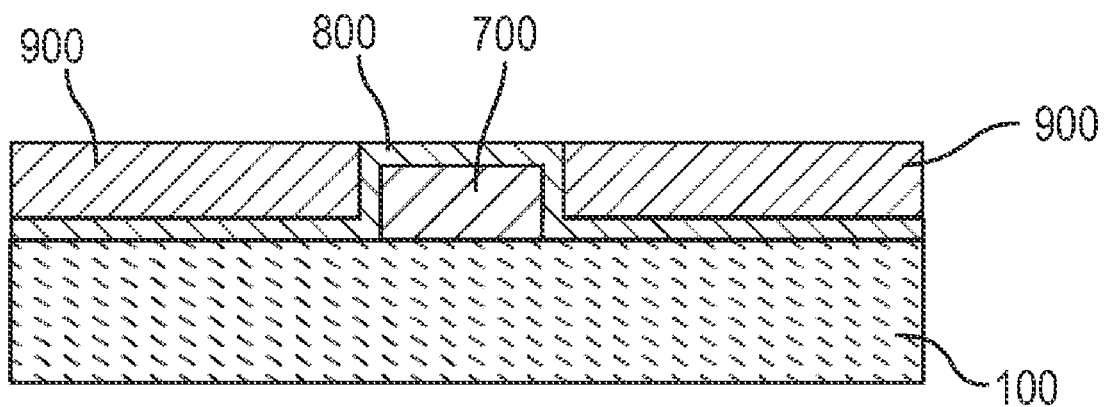
FIG. 1B depicts a first and second secondary metal plated over a primary metal.

To solve the above problem a second secondary metal 900 having a lower density than the first secondary metal 800, can be thickly plated over the first secondary metal 800 such that it covers the entire substrate 100 surface. The second secondary metal 900 can be a low stress metal, which generally relates to a 50 GPa or lower. The second secondary metal 900 is preferably plated in a thick layer, such as at a thickness between 10 to 200 microns. The combination of a first, high-density, secondary metal 800 and a second, low-density secondary metal 900 is shown in FIG. 1B. Advantageously the addition of the lower density of the second secondary metal 900 helps provide sufficient structural support to the primary metal 700 during machining, while providing less overall mechanical stress on the substrate 100 compared to a thick, first secondary metal 800 plating alone.

The secondary metals 800 and 900 used herein should be readily suitable for planarization by common machining techniques including grinding and abrasive lapping, for example and are preferably conductive. In one embodiment, the sacrificial, first secondary metal 800 may be copper, a copper alloy, or any other suitable metal, and can be electroplated around the primary metal 700. The second secondary metal is not the exact metal of the first secondary metal 800 but can be a different type of copper, copper alloy, or other suitable metal that can be electroplated. Potential second secondary metals include porous, grain stabilized, and composite metals such as: Cu, Pb, Ag, Au, Sn, In, Pb—Sn, and the like and alloys of the like, those familiar to the art of electrodeposition. According to certain embodiments, a copper composite with a suspension of ceramic powder may be used.

The process steps of plating primary metal structures 700 and two different secondary metals 800 and 900 described above can be repeated to create a multiple layered intermediary MEMS structure. The primary metal 700 and secondary metal 800 and 900 complex can then be machined until the primary metal 700 is in the desired form.

Regardless of its use for mechanical support or as a conductive plating base, the first secondary metal 800 and second secondary metal 900 are both entirely sacrificial, meaning that they will be completely removed before the final product, made of primary metal 700, is formed. Both of the secondary metals 800 and 900 (and any other secondary metals that may be present) can be etched away using an etching agent that will not substantially etch or otherwise damage the primary metal 700. According to even more specific embodiments, both the first 800 and the second 900 secondary metals (and any additional secondary metals) can be etched away using the same etching agent, such that a user does not need to use two different etching baths for each of the secondary metals. As one example, the etchant is typically an aqueous solution of acid, such as ferric chloride, and can be heated and directed under pressure to both sides of the plate. The etchant reacts with only the sacrificial secondary metals, and preferably corrodes them away fairly quickly.

Additionally, any seed layers, such as the primary and secondary seed layers, can also be etched away using different etching agents or the same as those used for the secondary metals. Preferably, each secondary metal and each seed layer can be removed with the same etching agent, in one step, without damaging the primary metal structure 700.

While the description herein has been mainly directed to the use of only a first and second sacrificial secondary metal, those with skill in the art will recognize that even more types of sacrificial metals can be plated without deviating from the teachings herein. The use of a third or fourth sacrificial secondary metal, for example is readily contemplated herein. Likewise, it is preferred that each plated secondary metal can be etched away with the same etching agent such that it does not damage the primary metal 700.

Superfilling the First Sacrificial Secondary Metal

Figure 3:
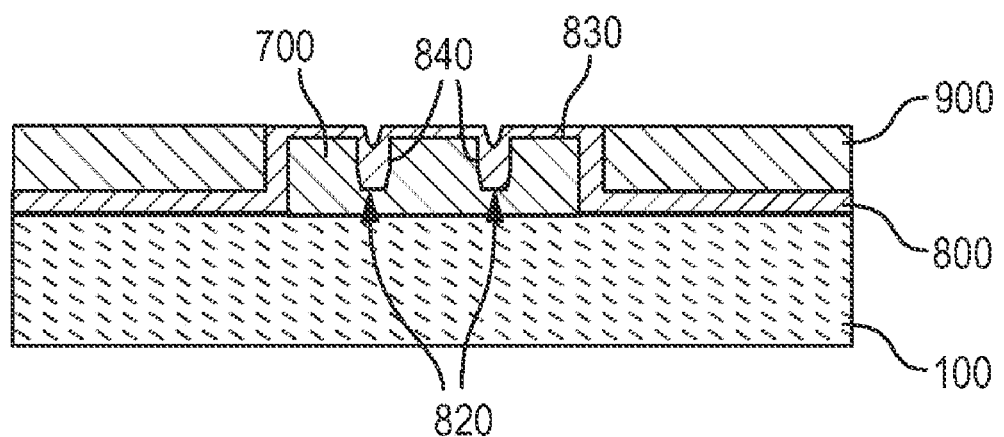
FIG. 3 depicts a primary metal structure having cavities superfilled by a first secondary metal and a second secondary metal plated over the first secondary metal.

The first sacrificial, secondary metal can be deposited, or more preferably electroplated, around the primary metal 700 such that it covers primary metal 700 surfaces tacking cavities or wells, and horizontal surface planes 830, at a slower speed than deposition within vertical wells 820 or spaces between primary metal features. Deposition along vertical surface planes 840, such as cavities, vertical wells 820, and spaces between primary metal features is done at a faster rate compared to horizontal deposition, and is referred to herein as "superfilling." Stated otherwise, the deposition rate of the sacrificial secondary metal 800 is greater at the bottom of a primary metal 700 feature or structural opening than at the top surface of the feature or structural opening. FIG. 3 depicts a primary metal structure 700 having wells 820 superfilled with a first secondary metal 800.

Superfilling is advantageous as it prevents voiding in the deposited sacrificial, secondary metal 800 and thus provides enhanced structural stability for the primary metal 700 during the machining process, compared to secondary metal having voids. Machining can, in general, relate to grinding, lapping, polishing, chemo-mechanical polishing, electric discharge machining, or any other commonly encountered machining processes.

Controlling the rate of vertical and horizontal deposition of a sacrificial, secondary metal can be done using suitable technique, such as those provided in Dubin and Andricacos, and the references cited and incorporated therein. Superfilling is a highly variable technique that depends on multiple factors, non-exclusively including: analytical reagents, additives, chemistry, and the critical dimension, which relates to the smallest feature that can be uniformly etched onto a given MEMS piece, Those with skill in the art will readily be able to assess the relevant variables needed for superfilling to sufficiently control rate control of secondary metal deposition.

Figure 4:
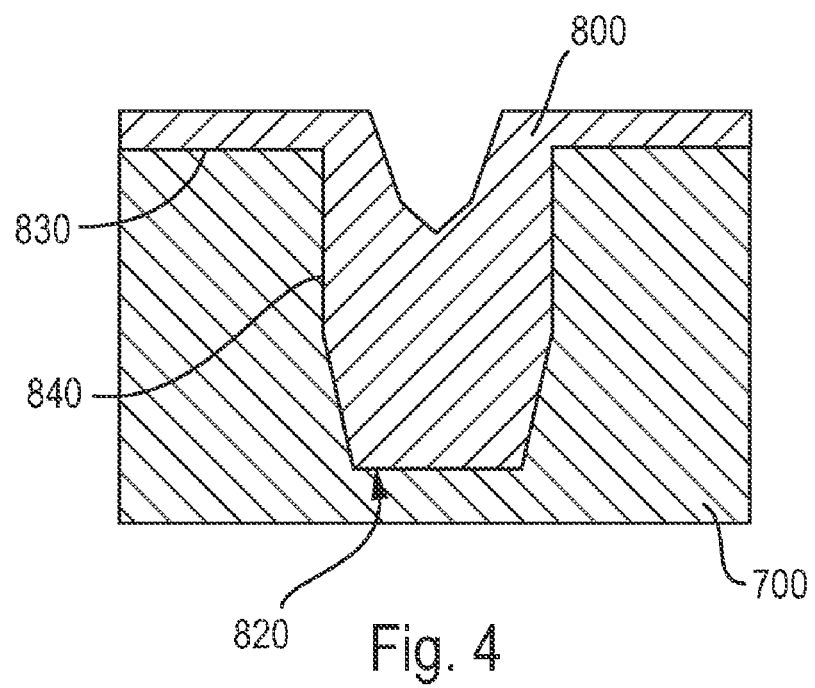
FIG. 4. depicts a primary metal cavity superfilled with a secondary metal.
Figure 5:
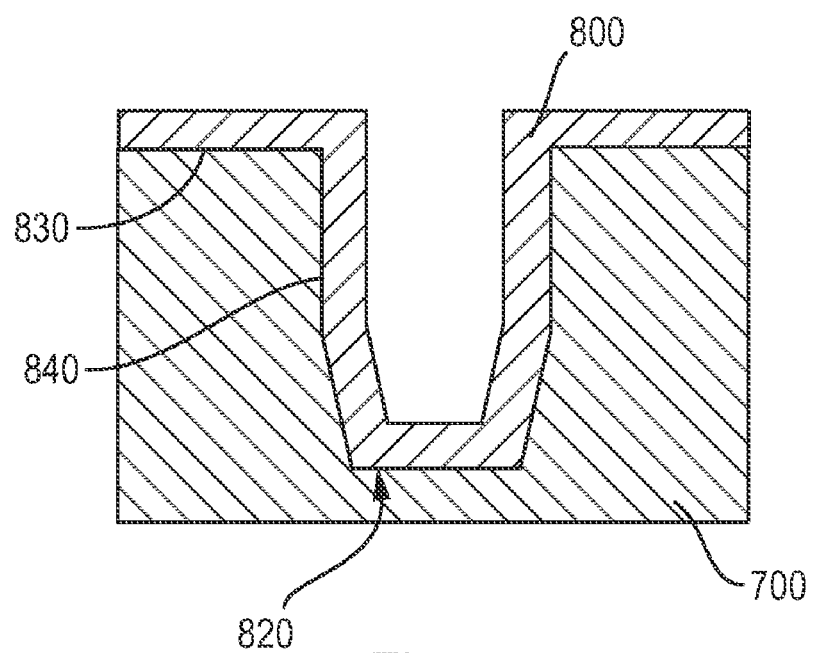
FIG. 5 depicts a prior art method of filling a primary metal cavity with a secondary metal.

Rate control of secondary metal deposition can be achieved through the use of additives in the secondary metal plating bath. Electrolytic plating from appropriately formulated solutions is one of the best ways to accomplish superfilling. In order to prevent the formation of voids in the secondary metal 800, the rate of electroplating should be higher at low or deep points within primary metal features 700 than elsewhere. A comparison between superfilling secondary metal and traditional secondary metal deposition is respectfully shown in FIGS. 4 and 5. As shown in FIG. 4 secondary metal 800 deposition between primary metal 700 features, such as wells 820, by using additives to the plating bath is faster than outside deposition along horizontal surfaces 830, for example. The preferential deposition in the interior features may be due to lower transport rates of additives at those locations which in turn leads to an increase in the local rate of secondary metal deposition in wells 820. Specifically at interior corners, the rate of additive transport is lowest thus the rate of secondary metal deposition is highest. In contrast, and as shown in FIG. 5, the rate of secondary metal deposition between primary metal 700 features using conventional secondary metallization techniques is slower. These conventional methods lead to voiding in the secondary metal 800 and thus deplete the support strength provided to the primary metal 700, during machining.

Additives may be added to the secondary metal plating bath for accomplishing superfilling. Copper plating from solutions incorporating additives conventionally used to produce level deposits on a rough surface can be used to accomplish superfilling to fill cavities between primary metal features. One suitable system of additives is the one marketed by Enthone-OMI, Inc., of New Haven, Conn. and is known as the SelRex Cubath M system. The above additives are referred to by the manufacturer as MHy. Another suitable system of additives is the one marketed by LeaRonal, Inc., of Freeport, N.Y., and is known as the Copper Gleam 2001 system. The additives are referred to by the manufacturer as Copper Gleam 2001 Carrier, Copper Gleam 2001-HTL, and Copper Gleam 2001 Leveller. Still another suitable system of additives is the one marketed by Atotech USA, Inc., of State Park, Pa., and is known as the Cupracid HS system. The additives in this system are referred to by the manufacturer as Cupracid Brightener and Cupracid HS Basic Leveler.

Plating additives that can allow superfilling can include brighteners (also known as accelerators), surfactants, levelers, suppressors, for example. Brighteners, or accelerators, typically comprise sulfur-containing organic compounds, and may also incorporate functional groups, such as described for example in U.S. Pat. No. 5,252,196 to Sonnenberg et al, the subject matter of which is incorporated herein by reference in its entirety. Examples of brighteners include Sulfopropyl disulfide (SPS) and mercaptopropanesulfonic acid (MPS). Any suitable surfactant, such as polyethylene glycol (PEG) can be used in the secondary metal baths provided herein. Levelers or leveling agents can include polyamines and reaction products of an amine with an alkylene oxide and epihalohydrins as well as dye compounds such as phenazinium compounds, as described for example in U.S. patent publication No. US 2007/0108062 to Brunner et al., U.S. patent publication No. US 2006/0226021 to Brunner et al., and U.S. patent publication No. US 2004/0231995 to Murao, the subject matter of each of which is incorporated herein by reference in their entireties. One example of a leveler is Janus Green B. Organic polymers can be used as the suppressors for copper electroplating. Further additives and/ or by-products can also be introduced to the secondary metal electroplating solution.

One preferred plating solution of copper that can be used as a sacrificial secondary metal 800 includes the following ingredients: Cu 50 g/l, Acid 80 g/l, Cl 50 ppm, Accelerator 12 mL/L, Suppresser 2 mL/L, and Leveler 3 mL/L.

Examples of specific additives which may be added to a bath in the instant invention are described in several patents. A few are listed herein and each is incorporated by reference in their entireties. U.S. Pat. No. 4,110,176, discloses the use of additives such as poly alkanol quaternary-ammonium salt which forms as a reaction product to give bright, highly ductile, low stress and good leveling copper deposits from an aqueous acidic copper plating bath. U.S. Pat. No, 4,376,685, to A. Watson, describes plating bath additives such as alkylated polyalkyleneimine which form as a reaction product to provide bright and leveled copper electrodeposits from an aqueous acidic bath.

U.S. Pat. No. 4,975,159, to W. Dahms, describes many different organic additives, including at least one substituted alkoxylated lactam as an amide-group-containing compound in an amount to optimize the brightness and ductility of the deposited copper, that can be introduced to secondary metal plating baths according to the teachings herein. The additives provided in Tables I, II, and III can be used, as suitable, with the teachings herein. These additives non-exclusively include alkoxylated lactams, sulfur-containing compounds with water-solubilizing groups such as 3-mercaptopropane-1-sulfonic acid, and, organic compounds such as polyethylene glycol.

U.S. Pat. No. 3,770,598, to H-G Creutz, describes acidic copper baths containing a brightening amount of the reaction product of polyethylene imine and an alkylating agent to produce a quaternary nitrogen, organic sulfides carrying at least one sulfonic group, and a polyether compound such as polypropylene glycol.

U.S. Pat. No. 3,328,273, to H-G Creutz et al., describes copper sulfate and fluoborate baths for obtaining bright, low-stress deposits with good leveling properties that contain organic sulfide compounds of the formula $XR_1$—$(S_n)$—$R_2$—$SO_3H$, where $R_1$ and $R_2$ are the same or different and are polymethylene groups or alkyne groups containing 1-6 carbon atoms, X is hydrogen or a sulfonic group, and n is an integer of 2-5 inclusive. Additionally these baths may contain polyether compounds, organic sulfides with vicinal sulphur atoms, and phenazine dyes. Table I and Table II of this patent provide specific additives including polysulfide and polyether compounds which may be added to a sacrificial secondary metal bath using the teachings herein.

Adding chloride ion and MHy additive to a secondary metal solution, such as 0.3 M cupric sulfate and 10% by volume sulfuric acid, can lead to superfilling. MHy concentrations that produce superfilling can be in the range from about 0.1 to about 2.5 percent by volume. Chloride ion concentrations that allow superfilling can be in the range from 10 to 300 ppm. Similar superfilling results can be obtained from a solution containing cupric sulfate in the rate from 0.1 to 0.4M, sulfuric acid in the range from 10 to 20% by volume, chloride in the range from 10 to 300 ppm, and LeaRonal, additives Copper Gleam 2001 Carrier in the range from 0.1 to 1% by volume, Copper Gleam 2001-HTL in the range from 0.1 to 1% by volume, and Copper Gleam 2001 Leveller in the range 0 to 1% by volume. Finally, similar superfilling results can be obtained from a solution containing cupric sulfate, sulfuric acid, and chloride in the ranges mentioned above and Atotech additives Cupracid Brightener in the range from 0.5 to 3% by volume and Cupracid HS Basic Leveller in the range from 0.01 to 0.5% by volume.

The superfilling techniques used herein are not directed to encasing features less than 50 microns. More specifically secondary metallization herein is used to encase 50-100 micron primary metal (e.g., nickel) features. The plating processes provided herein are preferably done where the substrate surface is held in contact only with the free surface of the electrolyte (as opposed to submerged in the electrolyte), such as in a cup plating cell. (See U.S. Pat. No. 4,339,319, to S. Aigo, which is incorporated herein by reference in its entirety). When the surface to be plated is held in contact with the meniscus of the electrolyte during plating, cavities of large widths (50-100 microns) can be filled rapidly and evenly at the same rate. The superfilling properties of meniscus plating is due to the higher concentration and perhaps different orientation of the surface-active additive molecules at the air-liquid surface. Though these molecules may begin to redistribute when the surface to be plated is introduced, residual effects probably persist throughout the plating period, several minutes in duration. Paddle plating cells are not preferred for plating the wider cavities (50-100 microns) present in MEMS fabrication.

The electroplated sacrificial secondary metal is preferably substantially made of Cu and may also contain small amounts of atoms and/or molecular fragments of C (less than 2 weight percent), with O (less than 1 weight percent), N (less than 1 weight percent), S (less than 1 weight percent), or Cl (less than 1 weight percent). These additional components apparently originate from the decomposition of additives and are subsequently incorporated in the deposit in the probable form of molecular fragments rather than atoms.

Methods of controlling additives in a copper plating solution are also provided in U.S. Pat. No. 6,592,747 to Horkans, et al., which is expressly incorporated herein in its entirety. This patent teaches organic addition agents in copper plating baths that are monitored by diluting a sample of the bath with sulfuric acid and hydrochloric acid and optionally a cupric salt. The dilution provides a bath having conventional concentrations of cupric ion, sulfuric acid and hydrochloric acid; and adjusted concentrations of the organic addition agents of 1/X of their original values in the sample; where X is the dilution factor. CVS techniques are used to determine concentrations of organic addition agents.

Additional and alternative procedural steps from those provided above can be used for MEMS fabrication as desired. The invention may be embodied in other specific forms besides and beyond those described herein. The foregoing embodiments are therefore to be considered in all respects illustrative rather than limiting, and the scope of the invention is defined and limited only by the appended claims and their equivalents, rather than by the foregoing description.

The invention claimed is:

1. A process for fabricating a multi-layer micro-electromechanical system, comprising:
   a) providing a primary metal structure supported by a substrate;
   b) depositing a first sacrificial secondary metal in a thin layer around the primary metal structure and over the entire surface of the substrate;
   c) depositing a second sacrificial secondary metal in a thick layer around first sacrificial secondary metal and over the entire surface of the substrate;
   d) machining the primary and first and second sacrificial secondary metals;
   e) repeating steps (a)-(d) above until a desired multi-layered structure is fabricated; and
   f) etching away the first and second sacrificial secondary metals from the machined primary metal structure to form a multi-layered micro-electro-mechanical system; wherein the deposited second sacrificial secondary metal is of a lower density than the first sacrificial secondary metal, such that the combination of these metals does not cause the substrate to warp.

2. The process of claim 1, wherein the etching away of the first and second sacrificial secondary metals does not substantially etch the machined primary metal structure.

3. The process of claim 2, wherein both the first and second sacrificial secondary metals are etched away using the same etching agent.

4. The process of claim 1, wherein the deposited first and second sacrificial secondary metals provide horizontal mechanical support to the primary metal during machining.

5. The process of claim 1, wherein the primary metal comprises nickel.

6. The process of claim 1, wherein the first and second secondary metals comprise copper.

7. The process of claim 1, wherein the primary metal structure comprises cavities along its surface area and the rate of deposition of the first sacrificial secondary metal is faster within the primary metal structure's cavities than outside of the cavities.

8. The process of claim 7, wherein the deposited secondary metal lacks significant voiding.

9. The process of claim 7, wherein the deposited sacrificial secondary metal is electroplated from a plating bath comprising organic additives selected from the group consisting of brighteners, levelers, and suppressants.

10. The process of claim 9, wherein the plating bath comprises copper at 50 g/L, acid at 80 g/L, chloride at 50 ppm, a brightener at 12 mL/L, a suppresser at 2 mL/L, and a leveler at 3 mL/L.

11. The process of claim 1, wherein the micro-electromechanical system is a spring that can be used in conjunction with a probe card assembly to test semiconductor devices.

* * * * *